United States Patent [19]

Yukl

[11] Patent Number: 4,494,009
[45] Date of Patent: Jan. 15, 1985

[54] METHOD AND APPARATUS FOR CAPTURING AN ELECTRICAL POTENTIAL GENERATED BY A MOVING AIR MASS

[76] Inventor: Tex Yukl, Pleasant Valley Rte., Box 21, Baker, Oreg. 97814

[21] Appl. No.: 533,237

[22] Filed: Sep. 19, 1983

[51] Int. Cl.³ ............................ F03D 5/04; H02P 9/04
[52] U.S. Cl. ........................................ 290/55; 290/43; 290/44; 290/54; 310/308
[58] Field of Search .................. 290/42, 43, 44, 45, 290/52, 53, 54, 55; 416/132 B; 310/10, 11, 308, 309, 310; 60/202; 322/2 R, 2 A

[56] References Cited

U.S. PATENT DOCUMENTS

| | | | |
|---|---|---|---|
| 28,793 | 6/1860 | Uion | 310/308 X |
| 414,943 | 11/1889 | Dewey | 310/308 X |
| 911,260 | 2/1909 | Pennock | 310/308 X |
| 1,014,719 | 1/1912 | Pennock | 310/308 X |
| 2,239,693 | 4/1941 | Benett | 310/308 X |
| 2,279,586 | 2/1939 | Benett | 310/308 X |
| 4,146,800 | 3/1979 | Gregory et al. | 290/44 |
| 4,206,396 | 6/1980 | Marks | 290/44 X |
| 4,302,684 | 11/1981 | Gogins | 290/44 X |
| 4,433,248 | 2/1984 | Marks | 290/55 X |

Primary Examiner—J. V. Truhe
Assistant Examiner—Paul Shik Luen Ip
Attorney, Agent, or Firm—Kolisch, Hartwell, Dickinson & Anderson

[57] ABSTRACT

A method and apparatus for making available an electrical current, which comprises placing a conductive airfoil in a moving air mass, sinking a conductive element subsurface, and insulating the airfoil from the conductive element and producing an electrical potential between the airfoil and the element in a moving air mass.

4 Claims, 5 Drawing Figures

METHOD AND APPARATUS FOR CAPTURING AN ELECTRICAL POTENTIAL GENERATED BY A MOVING AIR MASS

BACKGROUND AND SUMMARY OF THE INVENTION

The instant invention relates to a method and apparatus for capturing an electrical potential generated by a moving air mass. Specifically, the instant invention describes a method and apparatus for capturing an earth-air static electrical potential which is produced by an air mass moving over a stationary airfoil.

Known apparatus and methods of producing electricity from a moving air mass utilize windmills and windmill-driven turbines. Such devices are generally mounted on fairly high towers and require complex propeller systems to effectively drive electrical turbines. The systems also tend to have a rather large affect on the air mass as it passes over the blades of a particular windmill. As with the placement of any artificial barriers in an air mass, the air mass is disturbed, and turbulence is induced into the air mass. As a particular particle of the air mass reaches the next windmill, the induced turbulence results in less driving force on the blades of the secondarily driven windmill.

The present invention does not have a propeller system, nor does it induce significant turbulence into a moving air mass. It is well documented that an object, particularly an airfoil, which is moving relative to an air mass, develops a substantial static electrical charge on its surface relative to the air mass as the result of friction between the airfoil and the air mass. This naturally occurring static charge is particularly strong when the airfoil is a conductive surface, such as a metal-covered aircraft wing. For this reason, virtually all metal-covered aircraft employ static discharge strips along the trailing edges of airfoil surfaces in order to dispel any accumulated static electrical charge.

An object of the instant invention is to collect electrical energy from movement of an air mass over an airfoil.

Another object of the instant invention is to collect electrical energy with a non-complex collecting element.

A further object of the instant invention is to collect electrical energy from movement of an air mass over an airfoil with a substantially non-turbulence producing system.

A further object of the instant invention is to describe a method of collecting electrical energy from the frictional effects of an air mass moving over a conductive airfoil.

The electrical system of the instant invention includes a conductive airfoil, which is rotatably mounted on an insulated bearing, the airfoil being free to align itself with a moving air mass. A second component of the system is a ground rod which extends down to a water table level. Electrical leads are connected to a conductive portion of the airfoil and to the ground rod, and are then connected to a storage battery.

The method of collecting electrical energy from the system involves connecting the negative side of the storage battery to the airfoil and connecting the positive side of the battery to the ground rod. As an air mass moves over the surface of the airfoil, an electrical charge is produced and transmitted to the storage battery. Electrical energy may be drawn from the storage battery as needed.

These and other objects and advantages of the instant invention will become more fully apparent as the detailed description of the invention which now follows is read in conjunction with the drawings.

DETAILED DESCRIPTION OF A PREFERRED EMBODIMENT

Figure 1:
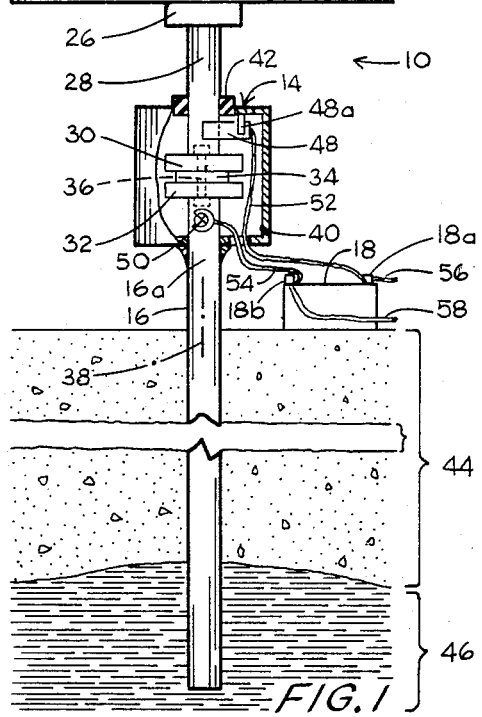
FIG. 1 is a front elevation of an earth-air electrical current friction generator constructed according to the instant invention, with portions broken away to show interior detail.

Turning now to the drawings, and in particular FIG. 1, an earth-air electrical current friction generator made according to my invention is depicted generally at 10. The generator includes a metal airfoil, or conductive airfoil means, shown generally at 12, which is supported by a rotatable airfoil mount 14 and an electrically conductive electrode 16. A battery 18 provides storage capability for the collecting apparatus.

Airfoil 12 is vertically mounted above ground level. The airfoil is a zero-lift structure in the preferred embodiment, since both active surfaces are symmetrical. Airfoil 12 is formed of a conductive metal skin 20, formed of lightweight aluminum sheeting in the preferred embodiment, over a frame 22 which is shown behind the cut-away portion of skin 20. Frame 22 may be formed of any suitable material, such as wood, plastic or metal. In the preferred embodiment, frame 22 is a substantially square structure.

A wind vane 24 is mounted on the top and at one side of airfoil 12. Wind vane 24 is also referred to as an air mass alignment means, and provides that airfoil 12 will be windfollowing.

An airfoil support bracket 26 is attached to the base of airfoil 12. One end of a support post 28 is received within bracket 26. The other end of post 28 terminates in a non-conductive airfoil bearing race 30 and is received within mount 14. Bracket 26 and post 28 are electrically conductive and are electrically connected to skin 20.

Rotatable airfoil mount 14, or rotatable airfoil mounting means, electrically insulates airfoil 12 from electrode 16, and is referred to herein as isolation means or isolator means.

Airfoil mount 14 is, itself, supported by an aboveground portion 16a of electrode 16. Portion 16a terminates in a non-conductive electrode bearing race 32. A bearing 34 is interposed race 30 and race 32. The respective airfoil and electrode components are retained together by means of a fastener 36, which is a nut and bolt combination in the preferred embodiment. Fastener 36 aligns with an airfoil axis of rotation 38.

Mount 14 is enclosed by a cylindrical enclosure 40 which is secured to portion 16a and which allows post 28 to rotate within a weathertight seal 42. Enclosure 40 and seal 42 are, of course, electrically non-conductive.

Electrode 16 extends through whatever ground layers exist beneath the surface, which are depicted generally at 44, and then extends into a permanent water table layer 46. Extending electrode 16 into a water table provides an electrical surface which is as large as the water table. Although the generator would function if electrode 16 did not extend into a water table, the operation of the generator is greatly enhanced by extending electrode 16 to a water table, for reasons which will be explained later herein.

An electrical commutator 48, and a grounding screw 50, make electrical contact with post 28 and portion 16a, respectively. Commutator 48 is insulated from and fastened to enclosure 40 by bracket 48a. Commutator 48 is connected to a lead line 52 which is attached to battery negative terminal 18a, and screw 50 is attached to lead line 54 which is attached to battery positive terminal 18b. The commutator, screw and lead line comprise what is referred to herein as means for connecting, or connecting means.

Battery 18, although represented in FIG. 1 as a solitary unit, may obviously include a plurality of units, connected in series or parallel, depending on the output of generator 10. A pair of leads 56, 58, are shown coming off of battery 18, and would presumably be attached to an electrical distribution system, possibly through an A.C. inverter. The battery and leads 56, 58 compise an electrical system.

As an air mass moves over skin 20 of airfoil 12, there occurs an exchange of ions between the air mass and the surface of the airfoil. This exchange takes place as an air mass moves over any stationary object. In most instances, however, the object is sitting on the surface of the earth, in electrical communication therewith, and a charge does not accumulate on the surface of the object. Since the airfoil of the instant invention is insulated from the earth, a static charge builds up on the surface of the airfoil as an air mass flows over the airfoil.

As the air mass moves over airfoil 12, a collection of negatively charged ions builds up on the airfoil surface. Were there no electrical connection whatsoever between airfoil 12 and ground surface 44, and were it not for the fact that eventually a charge built up on airfoil 12 would dissipate into the air mass, a charge would eventually build up on airfoil 12 of sufficient strength to arc, such as the arc produced between a thunderstorm and the ground in the case of lightning, resulting in the complete discharge of the negative ions accumulated on airfoil 12.

The electrical charge which accumulates on airfoil 12 is drawn off of the airfoil by means of commutator 48, which is attached to battery 18. A corresponding positive charge is drawn off of electrode 16 by means of screw 50.

Figure 2:
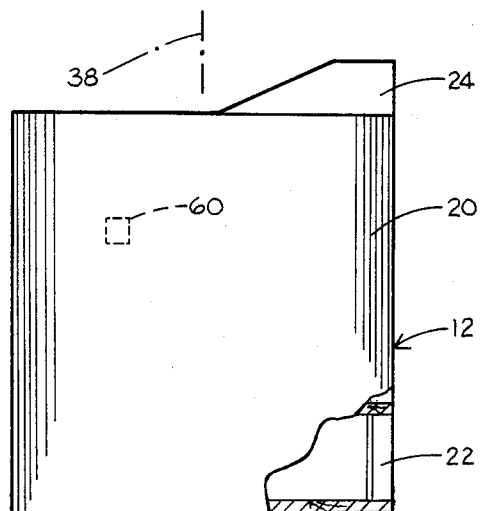
FIG. 2 is a top plan view of the generator of FIG. 1.

The surface area of airfoil 12 is defined by what is referred to herein as a cross-section square inch. This unit is depicted at 60 in FIGS. 1 and 2. The unit is measured on both sides of the airfoil. The distance between the sides of the airfoil is not a factor. So long as the surface area in electrical contact with electrode 16 equals or exceeds the surface area of airfoil 12, the generator will produce a current flow of 1-milliamp-per-square-inch of airfoil surface cross section with a wind speed of 7-miles-per-hour.

Because the airfoil collects negative ions, it is sometimes referred to as a negative collector element. Likewise, since electrode 16 acts as a source of a positive charge, it is sometimes referred to as a positive collector element, or conductive earth means.

Figure 3:
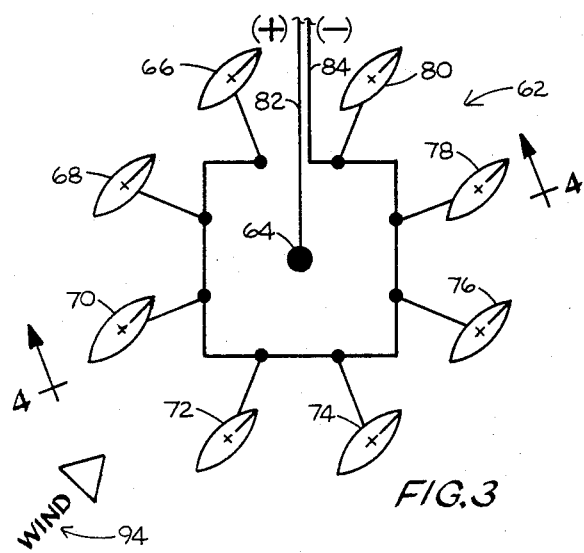
FIG. 3 is a schematic plan view of a generator field constructed according to the instant invention.
Figure 4:
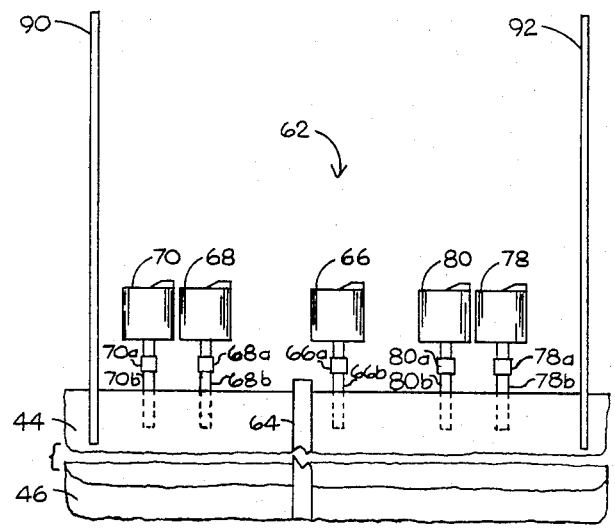
FIG. 4 is a view of the generator field of FIG. 3, taken generally along line 4—4 in that figure.

Turning now to FIGS. 3 and 4, a friction generator farm 62 is depicted schematically in FIG. 3, and in a pictorial cross section side view in FIG. 4. A generator farm, according to the instant invention, would include at least one conductive electrode 64, placed in the ground down to the level of a permanent water table, which would act as a positive collector element. A plurality of airfoils is depicted by even numbers 66 through 80. Electrode 64 is connected to a positive side of an electrical system by a conductive line 82. Airfoils 66 through 80 are connected to a common negative lead 84 which connects to the negative side of an electrical system.

Turning now to FIG. 4, a side sectional view of generator farm 62 is shown. Electrode 64 is placed in ground, represented by 44 as are the support posts for the airfoils. It should be noted that in this type of arrangement, a single commutator would be required within airfoil mounts 70a, 68a, 66a, 80a and 78a. An airfoil structure support post, represented at 70b, 68b, 66b, 80b and 78b may be formed from an electrically insulative material when a single electrode, like that shown at 64, is utilized, thereby further simplifying the internal portions of the airfoil mount.

In addition to earth-air friction generators, a pair of lightning rod devices 90, 92, are shown in FIG. 4. Rods 90 and 92 also are extended subsurface to provide protection from lightning strikes in the vicinity of generator farm 62. A generator farm of the type described would be particularly susceptible to damaging lightning strikes were such lightning rods not provided.

Returning for a moment to FIG. 3, a wind arrow 94 is depicted to show a prevailing wind and direction of air mass movement. It will be noted that airfoils 66 through 80 have aligned themselves with the wind indicated by arrow 94. It should also be noted that with a generator farm in the layout proposed in FIG. 3, there would be very little disturbance of wind flow by the airfoils of the generator farm. This is in extreme contrast to the turbulence and generally delaminating effect of conventional windmill generating farms.

It should also be obvious to those skilled in the art that the construction of the generator of the instant invention is many orders of magnitude less complex than the construction required for a conventional windmill-type turbine generator.

Figure 5:
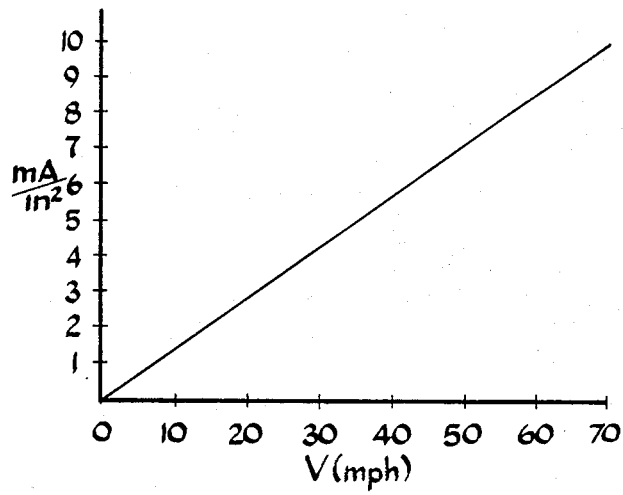
FIG. 5 is a graph depicting the relationship between current production and wind speed associated with the generator of FIG. 1.

Turning now to FIG. 5, a graph of current output per crosssection square inch mA/in$^2$ versus wind speed V (mph) is depicted. The above-described generator will produce 1-milliamp of electrical current per cross-section square inch with a 7-mile-per-hour wind. Generator output increases linearly, such that the generator will produce 10-milliamps per cross-section square inch in a 70-mile-per-hour wind. It should also be noted that very few known windmill turbine generators function in a 7- or 70-mile-per-hour wind. The generator of the instant application does not have such a limitation. The generator will produce current in any amount of wind, light or strong. As long as the structure is sufficiently durable to withstand a high wind, the system will continue functioning and producing an electrical current. Most systems are restricted to operations over a set wind speed range, generally in the 10- to 45-mile-per-hour range. Systems which produce electricity in extremely light wind conditions are very costly.

Assume for a moment, that an individual airfoil is constructed with sides which are 10-feet in length, thereby producing a cross section dimension on the order of 100-square feet, and further assume that ten airfoils are arranged similar to generator farm 62, thereby resulting in a total cross section area of 1,000-square feet. The generator farm so described, when connected to a 12-volt D.C. system, and when excited by a wind of 7-miles-per-hour, will produce 1,728-watts of electrical energy.

Thus, a new method of capturing a usable electric current, and an apparatus for practicing the method described have been disclosed. While a preferred embodiment of the invention has been described, it is appreciated that variations and modifications may be made without departing from the spirit of the invention.

It is claimed and desired to secure by Letters Patent:

1. An earth-air electrical current friction generator which comprises
    conductive earth means extending subsurface into a water table,
    conductive airfoil means operatively associated with said earth means extending above surface into an air mass responsive to airflow to produce an electrical potential relative to said earth means,
    isolation means electrically insulating said airfoil means from said earth means, said isolation means including a rotatable airfoil mounting means which allows said airfoil means to rotate in such an air mass and which supports said airfoil means above surface,
    an electrical system, and
    means for connecting said airfoil means and said earth means to said electrical system for conduction thereto of an electrical current.

2. An electrical charge collector which comprises
    a positive collector element extending to a water table,
    a negative collector element operatively associated with said positive collector element, said negative collector element being wind-following and including wind alignment means for aligning said negative collector element with a prevailing wind,
    isolator means for insulating said negative collector element electrically from said positive collector element, said isolator means including a rotatable mounting which rotatably supports said negative collector element, and
    connecting means for providing an electrical connection from each of said elements to an electrical system.

3. The collector of claim 2, wherein said positive collector element includes at least one conductive electrode.

4. The collector of claim 2, wherein said negative collector element includes at least one conductive airfoil.

* * * * *